(12) United States Patent
Baumhof et al.

(10) Patent No.: US 7,415,579 B2
(45) Date of Patent: Aug. 19, 2008

(54) MEMORY SYSTEM HAVING A PLURALITY OF MEMORY CONTROLLERS AND METHOD FOR SYNCHRONIZING THE SAME

(75) Inventors: Christoph Baumhof, Radolfzell-Euttingen (DE); Reinhard Kühne, Reichenau (DE)

(73) Assignee: Hyperstone GmbH, Constance (DE)

(*) Notice: Subject to any disclaimer, the term of this patent is extended or adjusted under 35 U.S.C. 154(b) by 244 days.

(21) Appl. No.: 10/537,700

(22) PCT Filed: Dec. 1, 2003

(86) PCT No.: PCT/EP03/13495

§ 371 (c)(1),
(2), (4) Date: Dec. 7, 2005

(87) PCT Pub. No.: WO2004/051490

PCT Pub. Date: Jun. 17, 2004

(65) Prior Publication Data

US 2006/0117150 A1 Jun. 1, 2006

(30) Foreign Application Priority Data

Dec. 4, 2002 (DE) .................................. 102 56 502

(51) Int. Cl.
*G06F 12/00* (2006.01)

(52) U.S. Cl. ..................................................... 711/151

(58) Field of Classification Search ................ 711/148, 711/151
See application file for complete search history.

(56) References Cited

U.S. PATENT DOCUMENTS

| 4,376,974 | A | * | 3/1983 | Stewart et al. ............... 711/100 |
| 4,773,005 | A | | 9/1988 | Sullivan |
| 4,893,302 | A | * | 1/1990 | Hemmady et al. ........... 370/427 |
| 5,265,231 | A | * | 11/1993 | Nuwayser .................... 711/106 |
| 5,689,675 | A | | 11/1997 | Buij et al. |
| 5,751,292 | A | * | 5/1998 | Emmot ......................... 345/587 |
| 6,026,464 | A | | 2/2000 | Cohen |
| 6,330,645 | B1 | | 12/2001 | Harriman |
| 6,397,314 | B1 | | 5/2002 | Estakhri et al. |
| 2006/0288153 | A1 | * | 12/2006 | Tanaka et al. ................ 711/103 |

* cited by examiner

*Primary Examiner*—Hiep T Nguyen
(74) *Attorney, Agent, or Firm*—Browdy and Neimark

(57) ABSTRACT

A memory system is provided which is configured with a plurality of memory controllers (SCx), disposed in parallel on a clocked bus (B), and memory chips (Fx) associated with the respective memory controllers (SCx). The system communicates via the bus (B) with a host system (HS) by operational memory commands that use logical memory sector numbers. The inventive system is characterized by an arbitration among the memory controllers so that for any memory operation requested by the host system (HS) the memory controller affected with respect to a range of logical memory sector numbers takes over the bus for communication with the host system.

13 Claims, 3 Drawing Sheets

MEMORY SYSTEM HAVING A PLURALITY OF MEMORY CONTROLLERS AND METHOD FOR SYNCHRONIZING THE SAME

FIELD

The invention relates to a memory system that is configured with a plurality of memory controllers disposed in parallel on a clocked bus and memory chips associated with the respective memory controllers, and that communicates via the bus with a host system by means of operational memory commands using logical memory sector numbers.

BACKGROUND

The size of a memory system, connected to a host system, is limited by the characteristics of the memory controller. These memory controllers are designed very simple for reasons of cost-effectiveness and they usually have the following characteristics:
- up to 100 connector pins because inexpensive standard housings are used,
- up to 10 chip select signals for the selection of memory chips,
- up to 16 Kbytes internal RAM memory.

Building larger systems with more than 10 memory chips requires additional external components, such as decoders, bus transceivers and possibly also RAM memory.

From patent application publication DE 102 27 256.5, for example, a system is known, wherein the memory chips of a larger memory unit are connected to a controller via additional components.

In patent document U.S. Pat. No. 6,397,314, a system of memory chips on a controller is described, wherein the controller has a double-wide data bus in order to supply two memory chips with data in parallel. This necessitates a non-standard memory controller, which requires additional connector pins. Furthermore, this system cannot be applied to still larger systems, since it is limited to two simultaneously addressable memory chips.

SUMMARY

The invention is based on the object of creating larger memory systems than can be implemented with only one standard memory controller, by combining multiple standard memory controllers without the use of additional components, wherein the maximum size is limited only by the number of utilized memory controllers. In order to manage with the number of connector pins prescribed by standard housings, only a minimum number of connector pins must be required for the interconnection of multiple memory controllers.

This object is met according to the invention in such a way that the memory system is configured with a plurality of memory controllers disposed in parallel on a clocked bus and memory chips associated with the respective memory controllers, and communicates via the bus with a host system by means of operational memory commands using logical memory sector numbers, in such a way that, when a memory operation is requested by the host system, the memory controller affected with respect to a range of logical memory sector numbers takes over the bus for communication with the host system by means of arbitration.

BRIEF DESCRIPTION OF THE DRAWINGS

The embodiment of the invention is described in the figures by way of example.

DETAILED DESCRIPTION

Figure 1:
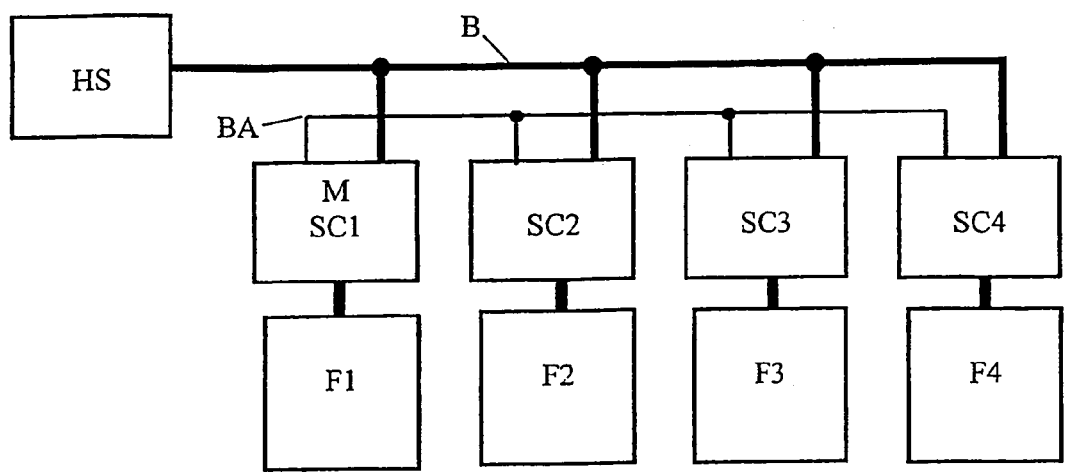
FIG. 1 shows a block diagram of the memory system.

Advantageous embodiments of the invention are described in the subclaims.

In PC systems, digital cameras, or similar equipment, referred to here as host system, a bus is used to access a memory system and operational memory commands are used to communicate with it. This bus may be implemented as so-called PCMCIA interface, IDE interface, or the like. The various possible applications of the host systems call for a scalable memory. With the parallel connection of a plurality of memory controllers with their respective assigned memory chips in a number that is maximally administratable by the controller, a scalable memory size is achieved by using always identical memory controllers, which does not require any additional components as long as the physical specification of the bus is adhered to. The communication of the controllers with the host system takes place by using standardized commands, whereby the memory is addressed using logical memory sector numbers. By means of an arbitration process, ranges of logical memory sector numbers are exclusively assigned to each memory controller. For host commands that affect the respective logical memory sector numbers, the assigned memory controller takes over processing of the command. The arbitration process ensures that all logical memory sector numbers are processed by one of the controllers in each case and that when a command is given, e.g., a read command for a memory range of multiple sector numbers, the controllers appropriately complement each other and take over the bus at the proper point in time.

Since there are a plurality of memory controllers that communicate with the host system, one of the memory controllers will advantageously be designated on the bus as the master. It carries out the communication with the host system as long as no other memory controller takes over the communication on the bus pursuant to the assigned memory sector number. More particularly, the master performs and responds to memory operations that affect the memory system as a whole. Memory operations of this type are, for example, "Reset", "Initialize", "SetFeatures", Diagnose". In the case of some memory operations the commands are performed by all memory controllers, the communication regarding the status, however, is conducted with the host system only by the master.

A significant advantage of the inventive implementation of the memory system is the use of only one line for arbitrating the bus between the memory controllers. This line is implemented as a tri-state line and has the three electric states "0", "1", "tri-state". The state "0" may then, for example, be assigned to the logical "reserved" of the bus and the state "1" to the logical "released". During initialization of the controllers, the controllers receive numbers that also establish the assigned range of logical memory sector numbers. For example, in the case of four controllers, controller 1 is assigned to memory sector numbers 0,4,8,12, ..., controller 2 to memory sector numbers 1,5,9,13, ..., controller 3 to memory sector numbers 2,6,10,14, ..., controller 4 to memory sector numbers 3,7,11,15, .... If, through a read command, sectors 4-11 are now to be read, controller 1 first takes over the bus for memory sector 4 by pulling the tri-state line to "0". When the memory sector 4 has been transmitted, the controller releases the bus by switching the tri-state line to "1" or to "tri-state". Controller 2 subsequently takes over the bus for memory sector 5 in the same manner. In this manner the bus is continually taken over successively by the controllers until all requested memory sectors, in this case through sector 11, have been transmitted.

In order to achieve a clean switch of the control over the bus between the controllers, a shield time is advantageously maintained during which the tri-state line is driven in a defined manner to "released". The time constant of the tri-state line with a pull-up resistor is not short enough during a fast bus operation. An advantageous shield time is one length of a clock cycle on the bus.

As described above, the memory controllers are advantageously assigned to logical memory sector numbers in such a way that successive memory sector numbers have different controllers assigned to them. In this manner as many logical memory sectors can be written or read quasi in parallel as memory controllers are available. In this manner, a high operating speed of the memory system is achieved.

A particularly advantageous implementation of the memory system results when flash memories are used as the memory chips. With this type of memory, long write and erase times occur as compared to read times. Due to the interleaving of the operation of continuous logical memory sector numbers by different memory controllers and, therefore, also different memory chips, these write and erase processes occur quasi in parallel, which increases the speed of the overall memory system. The real memory sectors, also referred to as "pages", that are written into the flash chips may be several times the size of the logical memory sectors.

A simple and cost-effective memory configuration results when the memory controllers are integrated together on a semiconductor substrate. With this type of configuration, the costs for the individual housings are eliminated, and the number of connector pins between them is of no importance. More particularly, additional control registers are then also provided on the semiconductor substrate, whereby, for example, the sequence of the individual memory controllers on the bus is established and the master is designated.

If such control registers do not exist, the designation of the master and establishing of the sequence of the memory controllers on the bus is established during initialization of the memory system by means of the following method:

The initializing host system knows the size of the memory system and number of utilized memory controllers. The tri-state line is in the "released" state. The host system sends, over the bus, a designation command that is recorded by all connected memory controllers. The memory controllers determine a wait time based on a counter that counts the applied clock cycle. The memory controller whose wait time ends first, pulls the tri-state line to "reserved" for a specified length of time. It now has the memory controller number 1 and is also designated as the master. The other memory controllers register this process. The master sends to the host system a confirmation signal. In response, the host system repeats the designation command. The master now withdraws from the designation procedure. All other memory controllers again wait according to their internally set wait time. The memory controller that now has the shortest wait time again occupies the tri-state line and, accordingly, is assigned the next memory controller number. The master again confirms the process to the host system. The memory controller that has now received a controller number also withdraws from the assignment process. The host system repeats the process with the designation command as often as corresponds to the number of memory controllers. If the host system receives no confirmation following a designation command because a controller number was issued in duplicate due to identical wait times, it repeats the entire process from the beginning.

The wait time during the designation process is advantageously derived from a counter in the memory controller by means of a randomly set counter reading. The cycle that is incremented in this case is generated separately in each memory controller by means of a RC oscillator which, due to component tolerances in each case, does not run synchronously with the others. The likelihood of identical wait times, even in the case of an identical random number for the counter reading, is therefore extremely small.

After the designation of the controller numbers, a so-called anchor sector is written into each memory controller, which then contains the information regarding the memory size according to the total number of logical sector numbers, the number of controllers, and the page size. With that, the memory controller has all necessary information to participate in the communication over the bus.

In FIG. 1, the host system HS communicates over the bus B with the memory controllers SCx. The x stands for the consecutive numbers 1 through 4. The memory controllers SCx are connected in parallel on the bus B. Each memory controller SCx controls memory chips Fx, which are preferably implemented in flash technology. In addition to the bus B, the memory controllers SCx are also connected to the arbitration line BA, which indicates the respective state "reserved" or "released". The line BA is implemented as a tri-state line with pull-up resistor. The first memory controller SC1 is, at the same time, designated as the master M.

Figure 2:
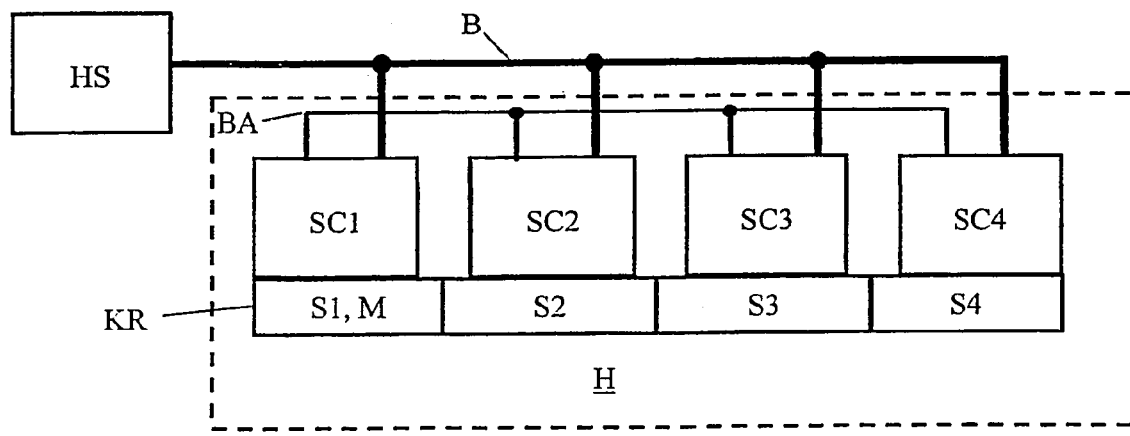
FIG. 2 shows the supplemented block diagram with integration of the memory controllers on a semiconductor substrate.

FIG. 2 shows the same block diagram as FIG. 1, without the memory chips Fx. The memory controllers SCx are integrated here on the semiconductor substrate H. Additionally provided on the semiconductor substrate H is the control register KR, which contains for each memory controller SCx a field that contains the controller number Sx and the designation of the master M. These values are written into the control register KR during initialization of the memory system.

Figure 3:
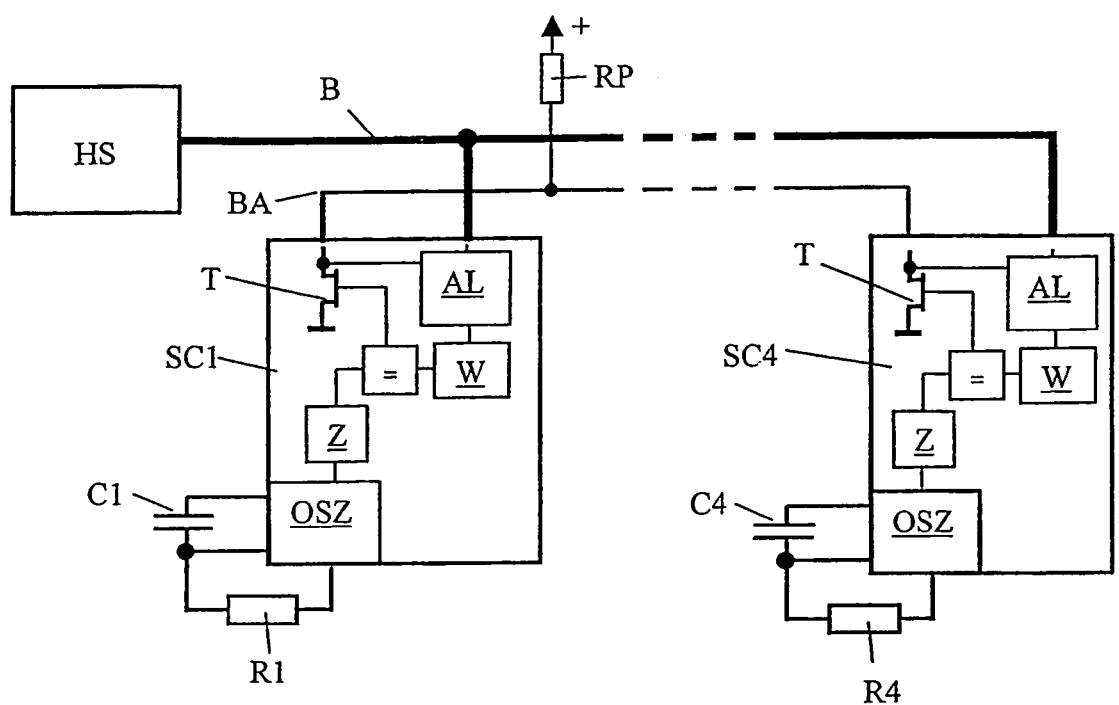
FIG. 3 shows a block diagram for the designation process of the memory controller numbers.

In FIG. 3 the components for the designation process of the memory controller numbers are illustrated in a block diagram. The evaluation logic AL in the respective memory controllers SCx monitors the commands from the host system HS that are transmitted over the bus B. Because of the pull-up resistance RP the idle state of the line BA equals "1".

Each memory controller SCx has a clock oscillator OSZ, whose frequency is determined by the capacitor Cx and the resistor Rx. The cycle that is generated here is incremented in the counter Z until the counter reading has reached the value W prescribed by the evaluation logic AL. As soon as this value is reached, the transistor T is switched through and the arbitration line BA is pulled to "0".

The evaluation logic AL is also connected to the arbitration line BA and monitors the same regarding whether another memory controller SCx has previously driven the bus to "0".

Figure 4:
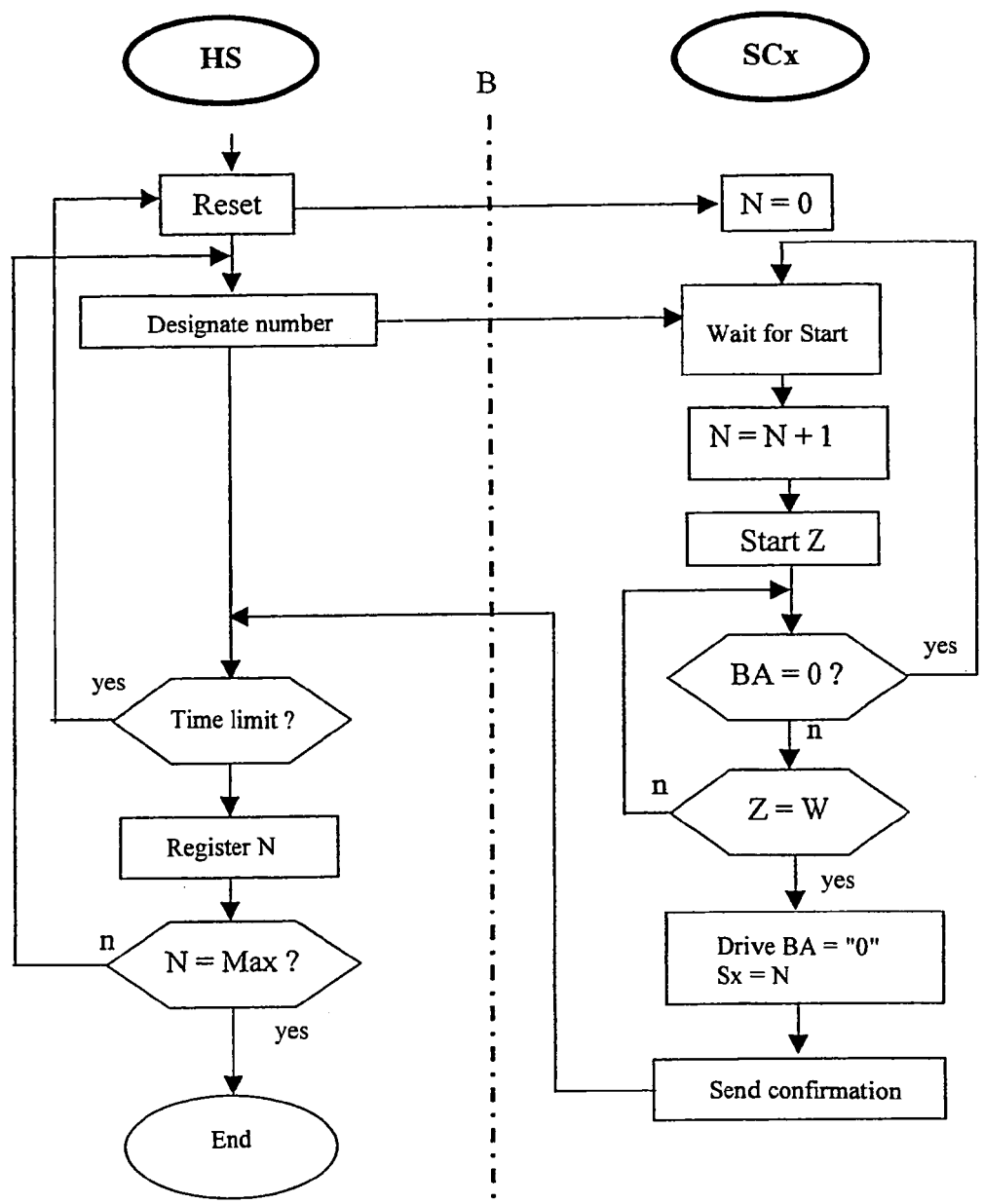
FIG. 4 shows a flow chart for the designation process of the memory controller numbers.

FIG. 4 is an illustration of the sequence of the designation of the controller numbers Sx. First the host system sends a reset command, which sets the repeat counter N to 0 in the connected controllers SCx. Afterwards the host system sends the designation command to the memory controllers SCx. They have been waiting for the command and increment the repeat counter by 1. They start the counter Z. During the wait for the counter reading to reach the random value W, the controller monitors the arbitration line BA. If the line BA takes on the state "0", another memory controller SCx has determined its controller number Sx and this controller returns to the wait mode. If the counter reading Z reaches the value W, this controller drives the arbitration line to "0" for a specified length of time and thus indicates that it has determined its controller number Sx. The controller number Sx corresponds to the value of the repeat counter N. The host system HS is sent a confirmation of the recording of controller number Sx.

The host system HS monitors the bus B for a transmission confirmation. If no confirmation is received within a specified time limit, the host system restarts the designation process from the beginning. If the confirmation is received within the specified time, the host system registers this process.

When the repeat counter N has reached the maximum value MAX corresponding to the number of specified memory controllers, the designation process is concluded. Otherwise additional designation commands will be sent.

LIST OF REFERENCE NUMERALS

AL Evaluation logic
B Bus
BA Arbitration line for the bus
Cx Capacitor on the oscillator x
Fx Memory chips
H Semiconductor substrate
HS Host system
KR Control register
M Master
Max Maximum number of memory controllers
N Number of repetitions of the designation command
OSZ Oscillator
RP Pull-up resistor
Rx Resistor on the oscillator x
Sx Controller numbers
SCx Memory controller
T Transistor
W Random number
x 1 . . . 4, consecutive number
Z Counter
= Comparator

What is claimed is:

1. A memory system that is configured with a plurality of memory controllers (SCx) disposed in parallel on a clocked bus (B) and memory chips (Fx) associated with the respective memory controllers (SCx), and that communicates via the bus (B) with a host system (HS) by means of operational memory commands using logical memory sector numbers, characterized in that in the case of a memory operation requested by the host system (HS), the memory controller (SCx) affected with respect to a range of logical memory sector numbers takes over the bus for the communication with the host system (HS) by means of arbitration.

2. A memory system according to claim 1, characterized in that one of the parallel memory controllers (SCx) is designated as the master (M) on the bus (B) and that it performs the communication with the host system (HS) as long as none of the other memory controllers (SCx) has taken over the bus (B).

3. A memory system according to claim 1, characterized in that the arbitration of the bus (B) between the memory controllers (SCx) takes place based on the addressed memory sector number and over a single tri-state line (BA) that indicates the reservation of the bus (B) by the affected memory controller (SCx) during the communication period with a "reserved" signal.

4. A memory system according to claim 3, characterized in that when the bus (B) is released by a memory controller (SCx), a shield time is inserted on the arbitration line (BA), during which the line (BA) is actively driven to "released".

5. A memory system according to claim 4, characterized in that the shield time corresponds to the length of one clock cycle of the bus (B).

6. A memory system according to claim 1, characterized in that for consecutive logical memory sector numbers different memory controllers (SCx) are assigned.

7. A memory system according to claim 1, characterized in that the memory chips (Fx) are flash memories that are erasable in blocks.

8. A memory system according to claim 1, characterized in that the memory controllers (SCx) are jointly disposed on a semiconductor substrate (H).

9. A memory system according to claim 8, characterized in that the designation of the sequence of the memory controllers (SCx) on the bus (B) and of the master (M) takes place by means of programming a control register (KR) to the respective memory controllers (SCx).

10. A method for determining a sequence of the memory controllers (SCx) in a memory system with multiple memory controllers which is operated by a host system (HS) over a bus (B) which includes an arbitration line (BA), comprising:
after a repeated designation command by the host system (HS), a memory controller (SCx) occupies, after a randomly determined amount of time, the arbitration line (BA) in each case for a specified length of time, provided that no other controller (SCx) has previously reserved the line (BA),
from the number of repetitions of the designation command the controller derives its controller number (Sx),
a confirmation signal is reported to the host system (HS) in each case,
the respective memory controller (SCx) withdraws from the designation process after the confirmation.

11. A method according to claim 10, characterized in that the memory controller (SCx) with the controller number 1 is designated as the master (M).

12. A method according to claim 10, characterized in that the host system (HS) repeats the designation process if insufficient designation confirmations are reported.

13. A method according to claim 10, characterized in that the random time for occupying the arbitration line (BA) is derived from a counter that is subject to component tolerances.

* * * * *